United States Patent
Wang et al.

(10) Patent No.: US 9,301,639 B2
(45) Date of Patent: Apr. 5, 2016

(54) BEVERAGE FOAMS MAKING DEVICE

(71) Applicants: Hsien-Ming Wang, Tainan (TW); Wei-Hsiang Wang, Tainan (TW)

(72) Inventors: Hsien-Ming Wang, Tainan (TW); Wei-Hsiang Wang, Tainan (TW)

(*) Notice: Subject to any disclaimer, the term of this patent is extended or adjusted under 35 U.S.C. 154(b) by 147 days.

(21) Appl. No.: 14/196,622

(22) Filed: Mar. 4, 2014

(65) Prior Publication Data
US 2015/0250350 A1     Sep. 10, 2015

(51) Int. Cl.
| | | |
|---|---|---|
| *B01F 3/04* | (2006.01) | |
| *A47J 31/44* | (2006.01) | |
| *B01F 7/00* | (2006.01) | |
| *B01F 7/16* | (2006.01) | |
| *B01F 7/26* | (2006.01) | |

(52) U.S. Cl.
CPC .......... *A47J 31/4403* (2013.01); *B01F 3/04453* (2013.01); *B01F 7/00458* (2013.01); *B01F 7/00466* (2013.01); *B01F 7/162* (2013.01); *B01F 7/26* (2013.01)

(58) Field of Classification Search
CPC ............. A47J 31/4403; B01F 3/04453; B01F 3/04531; B01F 3/04787; B01F 7/00458; B01F 2215/0022; B01F 7/00466; B01F 7/162; B01F 7/26
USPC ....................................... 261/91, 93, DIG. 26
See application file for complete search history.

(56) References Cited

U.S. PATENT DOCUMENTS

| | | | | | |
|---|---|---|---|---|---|
| 2,141,047 A | * | 12/1938 | Schulte | ............... | B01F 3/04531 261/93 |
| 4,281,423 A | * | 8/1981 | Fukunaga | ............... | A61H 33/02 261/124 |
| 4,664,530 A | * | 5/1987 | Kurome | ................ | A47J 43/046 366/205 |
| 8,425,107 B2 | * | 4/2013 | Tsai | ....................... | A47J 43/046 366/205 |
| 8,678,356 B2 | * | 3/2014 | Iwaki | .................. | B01F 3/04539 261/87 |
| 8,726,790 B2 | * | 5/2014 | Lane | ....................... | A47J 27/56 261/119.1 |
| 2004/0146621 A1 | * | 7/2004 | Kennedy | ............... | A23L 1/0121 426/523 |
| 2006/0158958 A1 | * | 7/2006 | Romanik | ............ | A47J 43/0465 366/205 |
| 2012/0300575 A1 | * | 11/2012 | Tsai | .................... | A47J 43/0722 366/205 |

FOREIGN PATENT DOCUMENTS

| | | | |
|---|---|---|---|
| DE | 2620310 C2 | * | 10/1982 |
| DE | 3213283 A1 | * | 11/1982 |
| DE | 10317631 A1 | * | 12/2003 |

* cited by examiner

*Primary Examiner* — Charles Bushey
*Assistant Examiner* — Scott Bushey
(74) *Attorney, Agent, or Firm* — Rosenberg, Klein & Lee

(57) ABSTRACT

A beverage foams making device includes a base having a shaft rotatably extending therethrough. A stirring member and a driving member are respectively connected to two ends of the shaft. The stirring member has multiple holes and at least one protrusion extends from the stirring member. The driving member is cooperated with a driving device which drives the shaft to rotate. A cup has a connection portion connected to the base and the stirring member is located in the cup. The stirring member generates foams when the beverage in the cup is stirred by the stirring member. Ice cubes are not broken when making the beverage. The device is mainly suitable for making beverages such as green tea and black tea, alternative, milk, coffee and/or juice is also available.

4 Claims, 4 Drawing Sheets

BEVERAGE FOAMS MAKING DEVICE

BACKGROUND OF THE INVENTION

1. Fields of the Invention

The present invention relates to a beverage foams making device, and more particularly, to a beverage foams making device having a stirring member with multiple holes so as to obtain fine foams.

2. Descriptions of Related Art

The conventional way to make foams to the beverage so as to increase the taste of the beverage is to shake the beverage in a cup manually. In other words, the beverage is put in a cup and the user shake the cup back and forth quickly to generate foams and special fragrance. Fructose, syrups and other flavoring substances can be added into the beverage to obtain the beverage. However, the manual way can easily damage the user's arms and wrists if too many cups of the beverage are required.

An electric foams making device is developed to make the foams to the beverage and generally comprises a cup, a separation member and a base, wherein the cup is threadedly connected to the base. The separation member is mounted to the base and located in the cup. The separation member has multiple holes. The base has a recess and a shaft extends from the inside of the recess. The shaft is connected with a stirring blade.

When in use, the cup and the base are connected with a driving machine which has a motor to drive the shaft and the stirring blade. The stirring blade stirs the beverage quickly so as to form the foams. Usually, the beverage is served with ice cubes so that the separation member is necessary to prevent the stirring blade from directly hitting the ice cubes. Nevertheless, the existence of the separation member makes the shaking device to be bulky and the manufacturing cost for the base is increased. Furthermore, the foams are affected by the separation member and cannot obtain the foams as desired.

The present invention intends to provide a beverage foams making device to improve the shortcomings mentioned above.

SUMMARY OF THE INVENTION

The present invention relates to a beverage foams making device and comprises a base having a shaft rotatably extending therethrough. A stirring member is connected to the first end of the shaft and has multiple holes.

Preferably, the stirring member has at least one protrusion extending therefrom.

Preferably, a driving member is connected to the second end of the shaft. The driving member is cooperated with a driving device which drives the shaft to rotate.

Preferably, the stirring member is a round disk.

Preferably, a cup has a connection portion connected to the lower end thereof. The connection portion is connected to the base and the stirring member is located in the cup.

Preferably, the connection portion has an outer threaded portion and the base has an inner threaded portion which is connected to the outer threaded portion.

Preferably, the connection portion has a seal connected to the underside thereof.

The beverage is stirred by the stirring member and the holes of the stirring member make fine foams in the beverage. When green tea or black tea is put in the cup, the protrusion on the stirring member blends green tea or black tea to generate fine foams. When the beverage is added with honey, syrups or cream, the protrusion blends them evenly to increase better taste and flavor to the beverage. The stirring member and the protrusion have simple structure and can easily make foams and blend the beverage and the additions. When the beverage is stirred with ice cubes, the ice cubes are maintained and not broken.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
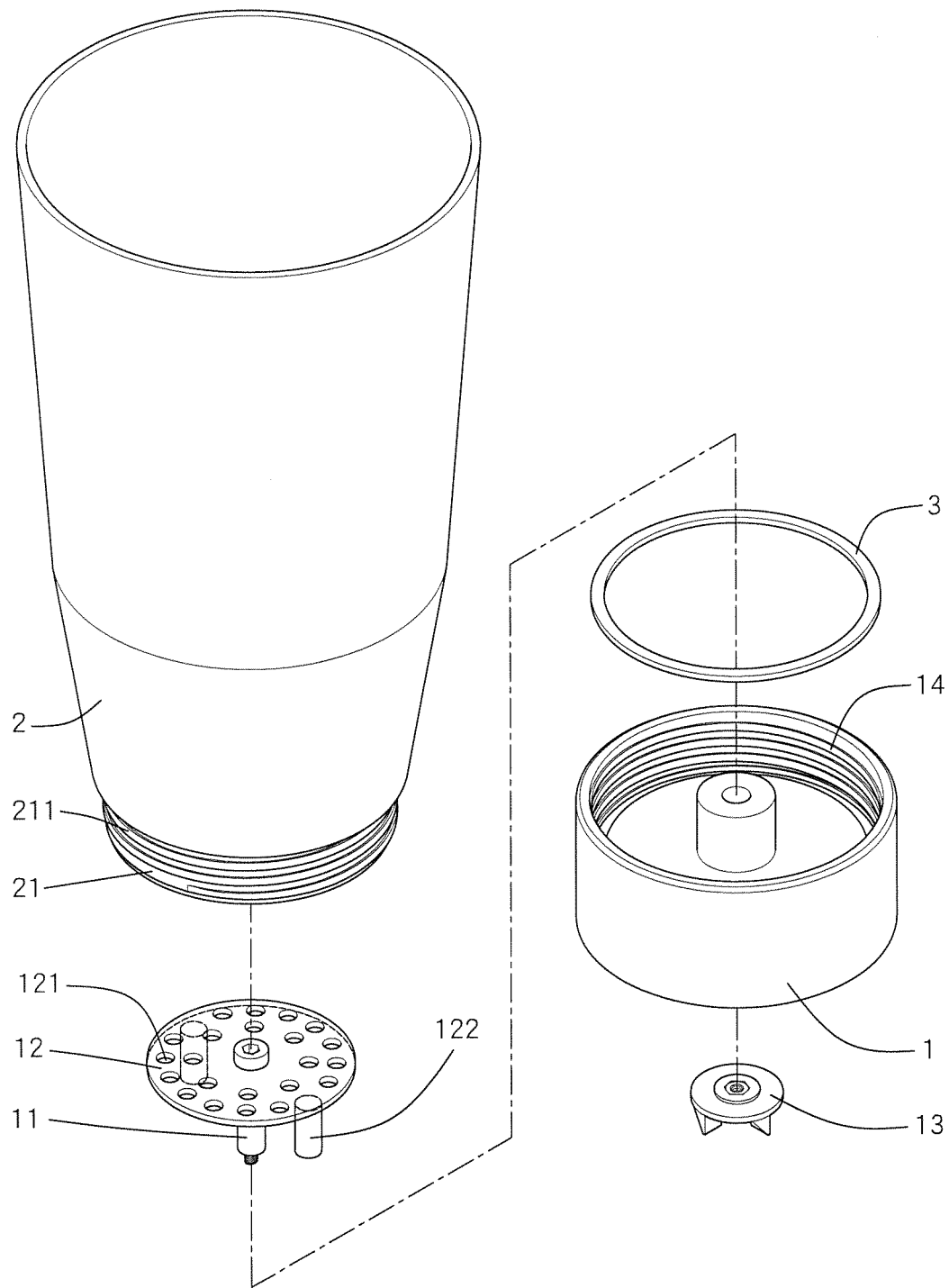
FIG. 1 is an exploded view of the beverage foams making device of the present invention.
Figure 2:
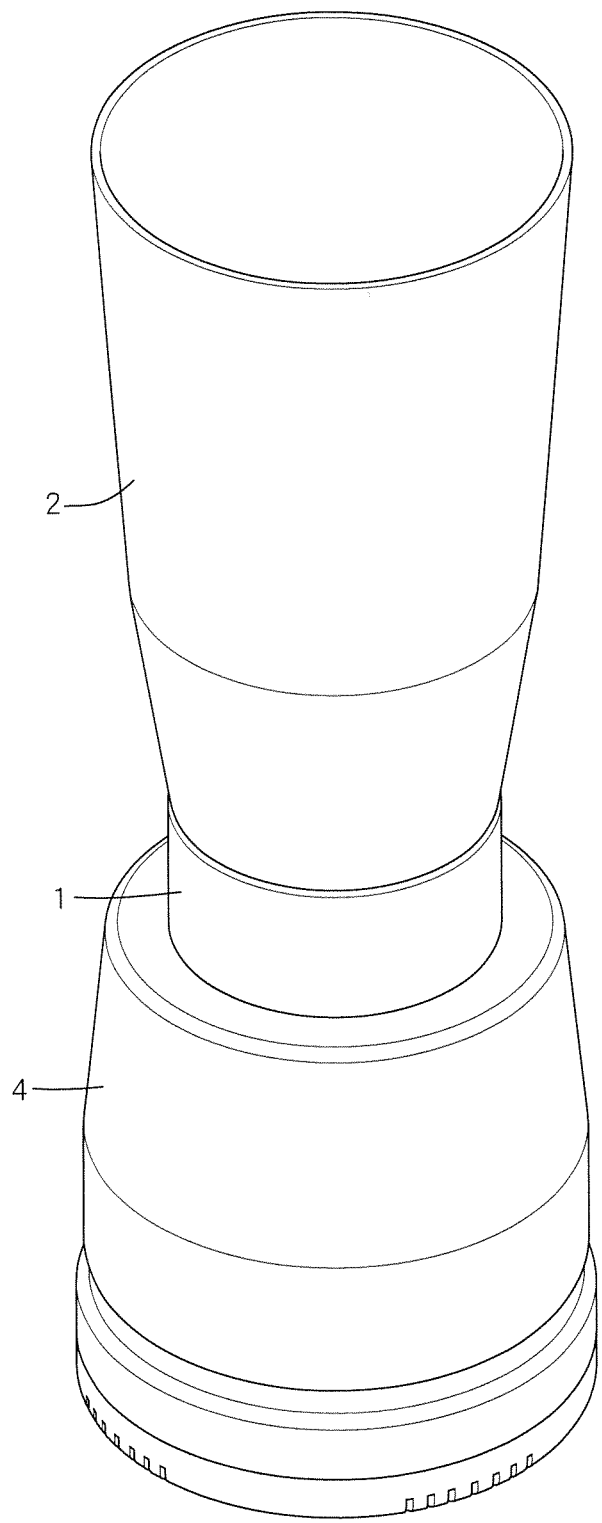
FIG. 2 is a perspective view to show that the beverage foams making device of the present invention is cooperated with a driving device.
Figure 3:
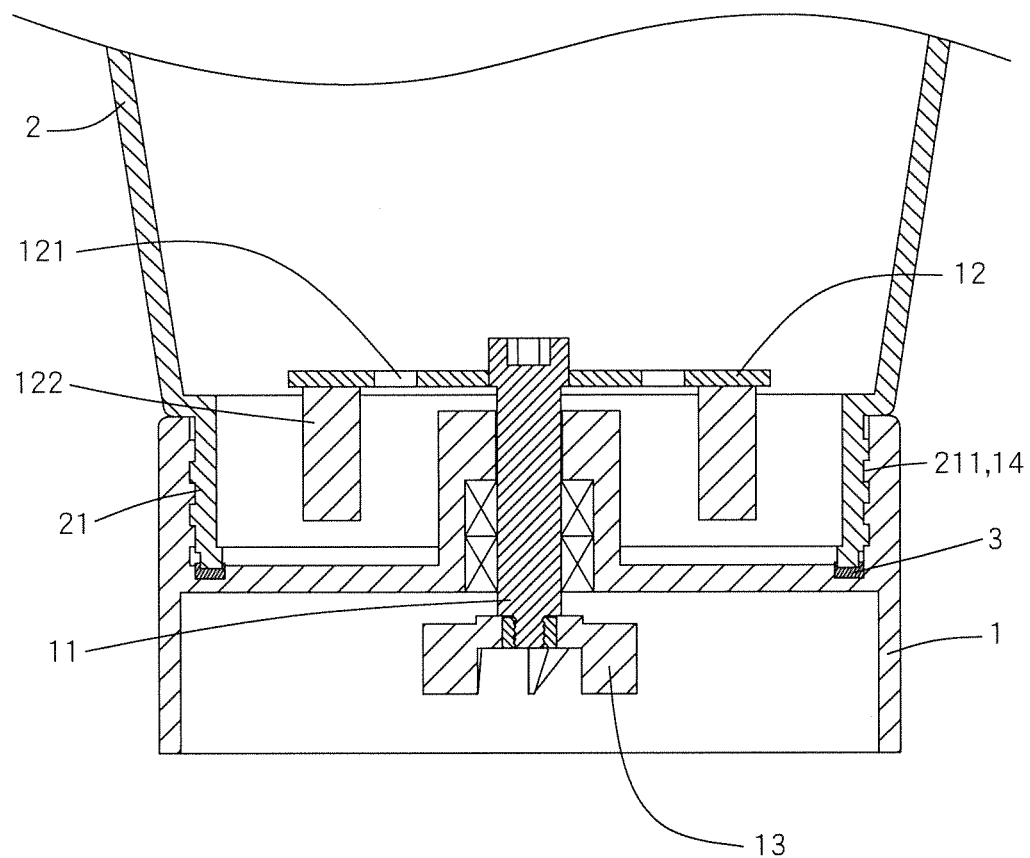
FIG. 3 is a cross sectional view showing the beverage foams making device of the present invention.

Referring to FIGS. 1 to 3, the beverage foams making device of the present invention comprises a base 1 and a shaft 11 rotatably extends through the base 1. A stirring member 12 and a driving member 13 are respectively connected to the first end and the second end of the shaft 11. The stirring member 12 is a round disk and has multiple holes 121. The driving member 13 is cooperated with a driving device 4 which drives the shaft 11 and the stirring member 12 to rotate. The base 1 has an inner threaded portion 14. The stirring member 12 has at least one protrusion 122 extending therefrom.

A cup 2 has a connection portion 21 connected to the lower end thereof, and the connection portion 21 has an outer threaded portion 211 which is connected to the inner threaded portion 14 so that the cup 2 is connected to the base 1. The stirring member 12 is located in the cup 2. The connection portion 21 has a seal 3 connected to the underside thereof so as to prevent from leakage.

Figure 4:
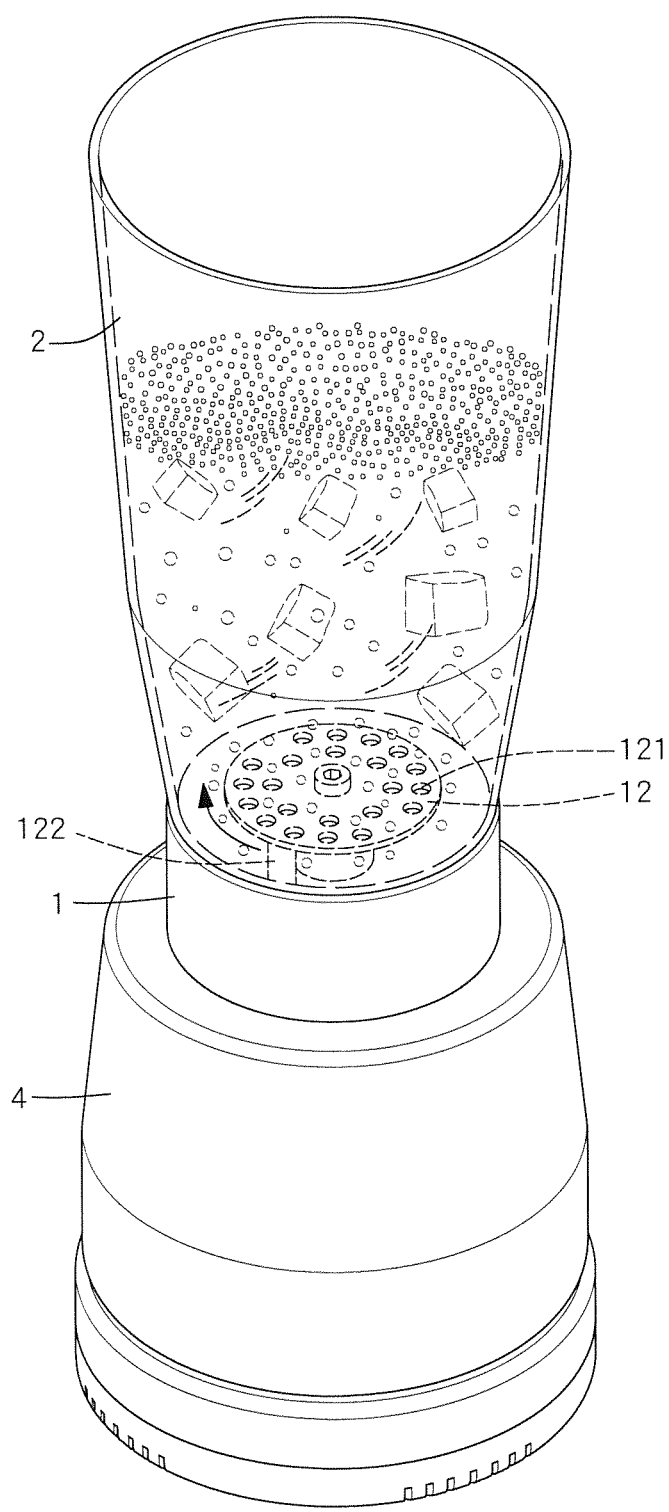
FIG. 4 shows that the beverage foams making device of the present invention is cooperated with the driving device to make a beverage.

As shown in FIGS. 2 to 4, when in use, the cup 2 is threadedly connected to the base 1, and the driving member 13 is connected to the driving device 4. The beverage such as green tea or black tea is put in the cup 2 and ice cubes are added, the driving device 4 drives the shaft 11 and the stirring member 12 to rotate to stir the beverage to mix with air to generate foams. The stirring member 12 has the at least one protrusion 122 extending therefrom so that the at least one protrusion 122 on the stirring member 12 blends the honey, syrups or cream evenly to increase the taste and flavor of the beverage. The at least one protrusion 122 also evenly blend the additions and the beverage.

The present invention has a simple structure and is easily operated to make foams, and the ice cubes are maintained and not broken.

It is noted that the beverage can also be milk, juice or coffee, and the same features are still available to these beverages.

While we have shown and described the embodiment in accordance with the present invention, it should be clear to those skilled in the art that further embodiments may be made without departing from the scope of the present invention.

What is claimed is:

1. A beverage foams making device comprising:

a base having a shaft rotatably extending therethrough, a stirring member connected to a first end of the shaft and having multiple holes, wherein the stirring member is parallel to the base and is a cylindrical and thin round disk with a flat top having an axial axis and includes at least one cylindrical protrusion located on an underside of the stirring member and extending therefrom, wherein the cylindrical protrusion is parallel to the axial axis of the stirring member; and a driving member connected to a second end of the shaft, the driving member in cooperation with a driving device which drives the shaft to rotate the stirring member about its axial axis.

2. The device as claimed in claim 1, wherein a cup has a connection portion connected to a lower end thereof, the connection portion is connected to the base, the stirring member is located in the cup.

3. The device as claimed in claim 2, wherein the connection portion has an outer threaded portion and the base has an inner threaded portion which is connected to the outer threaded portion.

4. The device as claimed in claim 2, wherein the connection portion has a seal connected to an underside thereof.

* * * * *